United States Patent
Omi et al.

(10) Patent No.: US 12,222,172 B2
(45) Date of Patent: Feb. 11, 2025

(54) EXPANSION VALVE

(71) Applicant: DENSO CORPORATION, Kariya (JP)

(72) Inventors: Yasumitsu Omi, Kariya (JP);
Yoshiyuki Adachi, Kariya (JP); Hefeng Liang, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/796,010

(22) Filed: Aug. 6, 2024

(65) Prior Publication Data

US 2024/0393068 A1 Nov. 28, 2024

Related U.S. Application Data

(63) Continuation of application No. PCT/JP2023/001185, filed on Jan. 17, 2023.

(30) Foreign Application Priority Data

Feb. 10, 2022 (JP) .................................. 2022-019562

(51) Int. Cl.
*F16K 27/10* (2006.01)
*F16K 27/02* (2006.01)
(Continued)

(52) U.S. Cl.
CPC ............ *F28F 27/02* (2013.01); *F16K 27/029* (2013.01); *F16K 27/102* (2013.01); *F16K 31/02* (2013.01); *F16K 31/046* (2013.01)

(58) Field of Classification Search
None
See application file for complete search history.

(56) References Cited

U.S. PATENT DOCUMENTS 4,177,972 A * 12/1979 Legris .................. F16K 5/0647
411/522
4,683,453 A * 7/1987 Vollmer ................ H01F 7/1607
335/278

(Continued)

FOREIGN PATENT DOCUMENTS

CN 1900565 A 1/2007
CN 106711533 A 5/2017
(Continued)

OTHER PUBLICATIONS

International Search Report and Written Opinion issued in International Application No. PCT/JP2023-001185, mailed Apr. 18, 2023; ISA/JP.

*Primary Examiner* — Matthew W Jellett
(74) *Attorney, Agent, or Firm* — Harness, Dickey & Pierce, P.L.C.

(57) ABSTRACT

An expansion valve includes: a partition member shaped in a cylindrical tubular form and receiving a rotor; a case placed at an outside of the partition member and having a cylindrical tubular portion coaxial with the partition member; an O-ring placed between the cylindrical tubular portion and the partition member; a bracket having a body-side portion extending in a direction parallel to an axial direction of the partition member and securely fastened to a body, and a case-side portion extending in a direction different from the axial direction and installed to the case; and a fastener member securely fastening the bracket to the body through the body-side portion. The case and the bracket form an enabler structure that is configured to enable movement of the bracket relative to the case in a fastening direction in which the bracket is fastened to the body by the fastener member.

8 Claims, 11 Drawing Sheets

(51) Int. Cl.
  *F16K 31/02* (2006.01)
  *F16K 31/04* (2006.01)
  *F28F 27/02* (2006.01)

(56) References Cited

U.S. PATENT DOCUMENTS

| | | | | |
|---|---|---|---|---|
| 6,789,781 | B2* | 9/2004 | Johnson | F16K 7/126 |
| | | | | 251/291 |
| 7,611,317 | B2* | 11/2009 | Muderlak | B05B 11/1008 |
| | | | | 411/522 |
| 8,632,054 | B2* | 1/2014 | Carlson | F16K 27/00 |
| | | | | 251/304 |
| 8,753,139 | B2* | 6/2014 | Moosmann | F16H 61/0003 |
| | | | | 439/350 |
| 10,634,261 | B2* | 4/2020 | Homma | F16K 27/00 |
| 2007/0018128 | A1 | 1/2007 | Arai | |
| 2012/0199776 | A1* | 8/2012 | Kreuter | F16K 31/045 |
| | | | | 29/525.01 |
| 2018/0080693 | A1 | 3/2018 | Wang et al. | |
| 2019/0178404 | A1 | 6/2019 | Zhang et al. | |
| 2020/0163263 | A1 | 5/2020 | Zhang et al. | |
| 2021/0140556 | A1 | 5/2021 | Zhang et al. | |

FOREIGN PATENT DOCUMENTS

| | | |
|---|---|---|
| CN | 107763285 A | 3/2018 |
| CN | 212692177 U | 3/2021 |
| CN | 213335059 U | 6/2021 |
| CN | 113758063 A | 12/2021 |
| EP | 1746319 A1 | 1/2007 |
| EP | 4155627 A1 | 3/2023 |
| JP | 2004239428 A | 8/2004 |
| JP | 2006112522 A | 4/2006 |
| JP | 200724206 A | 2/2007 |
| JP | 2007-263302 A | 10/2007 |
| JP | 201014277 A | 1/2010 |
| JP | 2020041658 A | 3/2020 |
| JP | 2020-519824 A | 7/2020 |
| KR | 10-2007-0011089 A | 1/2007 |
| KR | 10-2020-0043566 A | 4/2020 |
| TW | 200914756 A | 4/2009 |
| WO | WO-2009037724 A1 | 3/2009 |

* cited by examiner

EXPANSION VALVE

CROSS REFERENCE TO RELATED APPLICATIONS

This application is a continuation application of International Patent Application No. PCT/JP2023/001185 filed on Jan. 17, 2023, which designated the U.S. and claims the benefit of priority from Japanese Patent Application No. 2022-19562 filed on Feb. 10, 2022. The entire disclosures of all of the above applications are incorporated herein by reference.

TECHNICAL FIELD

The present disclosure relates to an expansion valve that adjusts a refrigerant flow rate at a refrigeration cycle.

BACKGROUND

Previously, there has been proposed an electronic expansion valve on which an electric circuit board is installed. According to this technique, a rotor, which drives a valve element of the electronic expansion valve, is placed in an inside space formed at an inside of a sleeve shaped in a cylindrical tubular form. The electric circuit board, which controls an operation of the electronic expansion valve, is placed at an outside of the sleeve. The electric circuit board is placed in a space that is formed between the sleeve and a case. A high-pressure refrigerant to be depressurized by the electronic expansion valve is present in the inside space of the sleeve. The sleeve is a member that forms a partition relative to the high-pressure refrigerant.

SUMMARY

This section provides a general summary of the disclosure, and is not a comprehensive disclosure of its full scope or all of its features.

According to the present disclosure, there is provided an expansion valve that includes a body, a valve element, a rotor, a partition member, a case, an O-ring, a bracket and a fastener member. The body forms a refrigerant flow passage. The valve element is configured to adjust an opening degree of the refrigerant flow passage. The rotor is configured to drive the valve element. The partition member is shaped in a cylindrical tubular form and is fixed to the body. The partition member receives the rotor. The case is placed at an outside of the partition member and has a cylindrical tubular portion that is coaxial with the partition member. The O-ring is placed between the cylindrical tubular portion and the partition member. The bracket has: a body-side portion that extends in a direction parallel to an axial direction of the partition member and is securely fastened to the body; and a case-side portion that extends in a direction different from the axial direction of the partition member and is installed to the case. The fastener member is configured to securely fasten the bracket to the body through the body-side portion. The case and the bracket form an enabler structure that is configured to enable movement of the bracket relative to the case in a fastening direction in which the bracket is fastened to the body by the fastener member.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
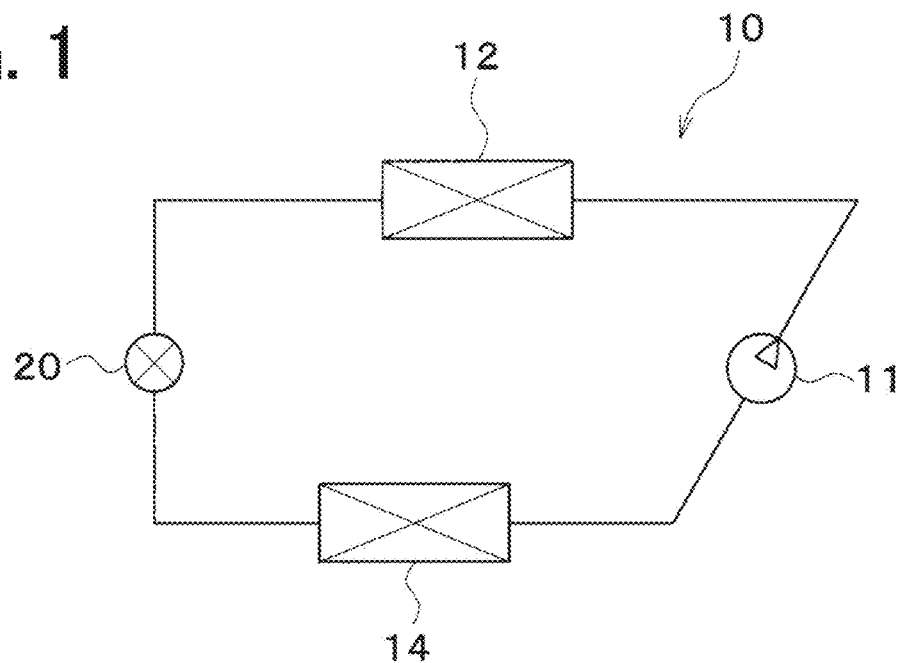
FIG. 1 is a view showing an overall structure of a vapor compression refrigeration cycle of a first embodiment.

Previously, there has been proposed an electronic expansion valve on which an electric circuit board is installed. According to this technique, a rotor, which drives a valve element of the electronic expansion valve, is placed in an inside space formed at an inside of a sleeve shaped in a cylindrical tubular form. The electric circuit board, which controls an operation of the electronic expansion valve, is placed at an outside of the sleeve. The electric circuit board is placed in a space that is formed between the sleeve and a case. A high-pressure refrigerant to be depressurized by the electronic expansion valve is present in the inside space of the sleeve. The sleeve is a member that forms a partition relative to the high-pressure refrigerant.

In the technique described above, it is necessary to provide a seal structure between the sleeve and the case to avoid ingress of water to the electric circuit board. For example, as the seal structure, it is conceivable to place an O-ring in a gap between the sleeve and the case.

However, when the case is assembled to a body of the electronic expansion valve, there is a risk that a center of the case becomes eccentric relative to the center of the sleeve due to a manufacturing error(s). When the case is eccentric relative to the sleeve, the O-ring may be unevenly compressed to deteriorate the sealing performance of the O-ring.

An expansion valve according to one aspect of the present disclosure includes a body, a valve element, a rotor, an electric circuit board, a partition member, a case, an O-ring, a bracket and a fastener member.

The body forms a refrigerant flow passage. The valve element is configured to adjust an opening degree of the refrigerant flow passage at an inside of the body. The rotor is configured to drive the valve element. The electric circuit board is configured to control rotation of the rotor. The partition member is shaped in a cylindrical tubular form and is fixed to the body coaxially with the valve element. The partition member receives the rotor. The case is placed at an outside of the partition member and receives the electric circuit board. The case has a cylindrical tubular portion that is coaxial with the partition member. The O-ring is placed between the cylindrical tubular portion and the partition member and is configured to limit intrusion of a liquid into an inside of the case. The bracket has: a body-side portion that extends in a direction parallel to an axial direction of the partition member and is securely fastened to the body; and a case-side portion that extends in a direction different from the axial direction of the partition member and is installed to the case. The fastener member is configured to securely fasten the bracket to the body through the body-side portion.

The case and the bracket form an enabler structure that is configured to enable movement of the bracket relative to the case in a fastening direction in which the bracket is fastened to the body by the fastener member.

By providing the enabler structure described above, at the time of securely fastening the bracket to the body, the manufacturing error(s) can be absorbed, and the case can be assembled coaxially with the partition member. Thus, the eccentricity of the case can be limited.

Hereinafter, embodiments of the present disclosure will be described with reference to the drawings. In each of the following embodiments, the same reference signs may be assigned to portions that are the same as or equivalent to those described in the preceding embodiment(s), and the description thereof may be omitted. Further, when only any one or more of the components are described in the embodiment, the description of the rest of the components described in the preceding embodiment may be applied to the rest of the components. In addition to the combination(s) of portions that is specifically shown to be combinable in the respective embodiments, it is also possible to partially combine the embodiments even if they are not specifically shown, provided that the combinations are not impeded.

First Embodiment

An expansion valve of the present embodiment is applied as an expansion valve 20 of a vapor compression refrigeration cycle 10 shown in FIG. 1. The vapor compression refrigeration cycle 10 is applied to a vehicle air conditioning device for a vehicle. The vehicle air conditioning device is applied to an electric vehicle that obtains a drive force for running the vehicle from an electric motor that is installed for running the vehicle.

The vapor compression refrigeration cycle 10 includes a compressor 11, a condenser 12, the expansion valve 20 and an evaporator 14. The compressor 11 is an electric compressor that is configured to compress a refrigerant after suctioning the refrigerant and discharge the compressed refrigerant. A fluorocarbon refrigerant (e.g., R134a) is used as the refrigerant that is circulated in the vapor compression refrigeration cycle. The vapor compression refrigeration cycle is a subcritical cycle in which a pressure of the refrigerant on a high-pressure side does not exceed a critical pressure of the refrigerant.

The condenser 12 condenses the refrigerant discharged from the compressor 11 by heat exchange with a water-based coolant or air. The expansion valve 20 depressurizes and expands the refrigerant condensed in the condenser 12. The evaporator 14 evaporates the refrigerant, which is depressurized and expanded by the expansion valve 20, by heat exchange with the air.

Figure 2:
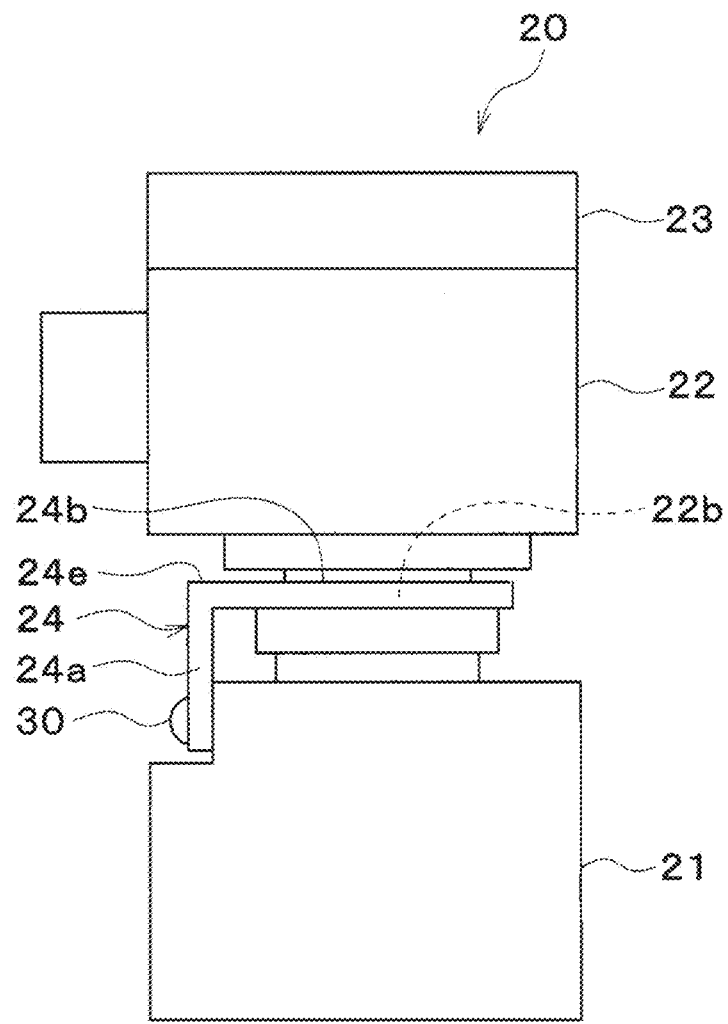
FIG. 2 is a front view showing an expansion valve of the first embodiment.
Figure 3:
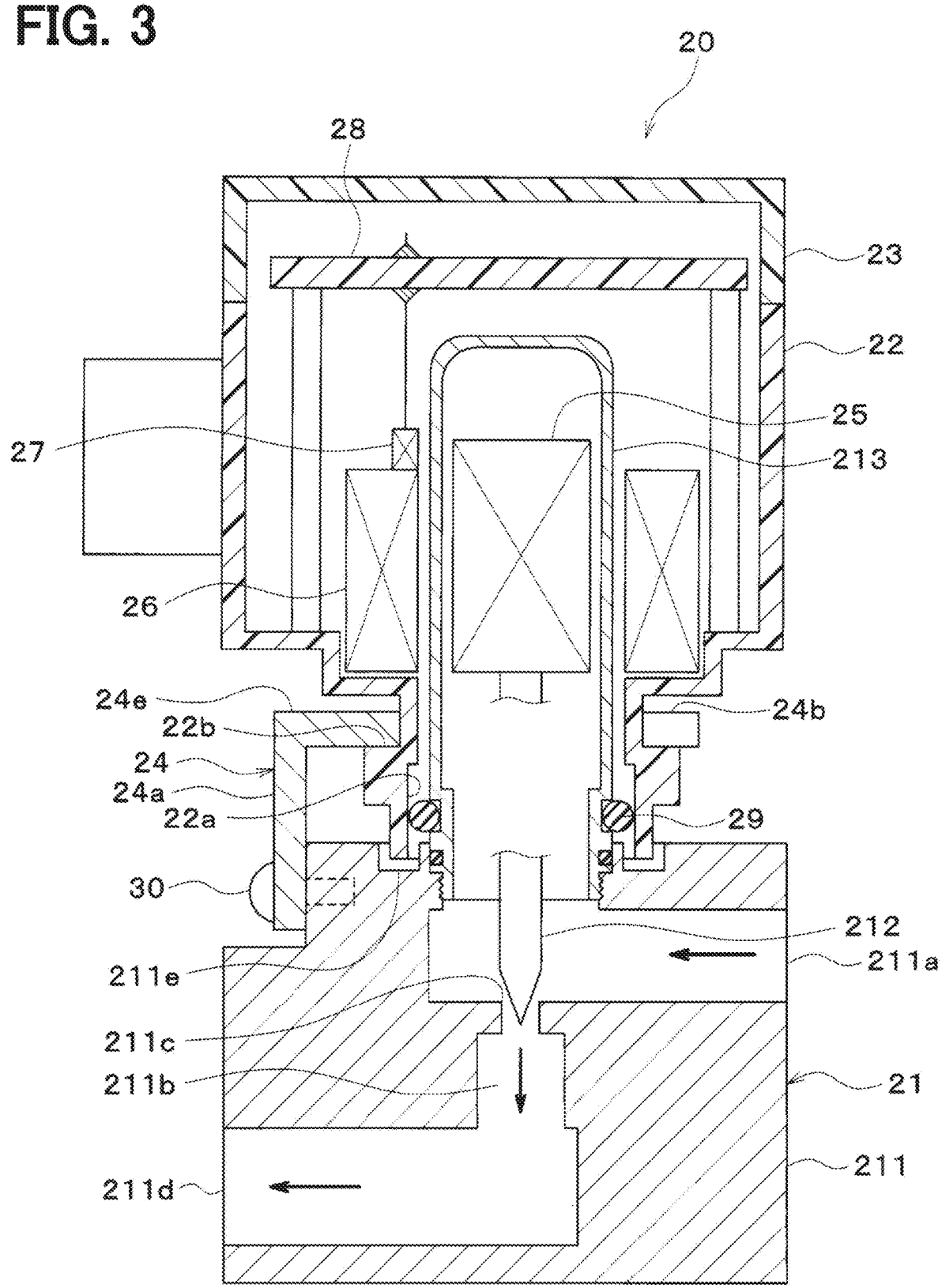
FIG. 3 is a cross-sectional view showing the expansion valve of the first embodiment.

The expansion valve 20 is an electric expansion valve in which a valve element is driven by an electric actuator. As shown in FIG. 2, the expansion valve 20 includes a main body 21, a lower case 22, an upper case 23 and a bracket 24. As shown in FIG. 3, the main body 21 includes a valve body 211, a valve element 212 and a partition member 213. The valve body 211 is a member shaped in a block form.

The valve body 211 has a flow inlet 211a for the refrigerant, a refrigerant flow passage 211b, a valve seat 211c and a flow outlet 211d for the refrigerant. The valve body 211 receives the valve element 212 and a screw mechanism (not shown).

A drive force is transmitted from a rotor 25 to the valve element 212 through the screw mechanism (not shown). The screw mechanism converts a rotational motion of the rotor 25 into a linear motion and transmits it to the valve element 212. The valve element 212 is moved by the drive force of the rotor 25 in an axial direction (an up-to-down direction in FIG. 3) toward or away from the valve seat 211c to adjust an opening degree of the refrigerant flow passage 211b. The refrigerant is depressurized and expanded by a flow throttling function implemented by a gap between the valve element 212 and the valve seat 211c when the refrigerant flows in the refrigerant flow passage 211b.

The partition member 213 is a rotor receiving member that receives the rotor 25. The partition member 213 is shaped in a cylindrical tubular form and is made of metal such as stainless steel. The partition member 213 is coaxial with the valve element 212. One end (an upper end in FIG. 3) of the partition member 213 is closed. The other end (a lower end in FIG. 3) of the partition member 213 is opened and is in close contact with the valve body 211. Thus, the high-pressure refrigerant before the depressurization is present in an inside space of the partition member 213. Therefore, the partition member 213 serves as a partition between the sealed refrigerant circuit, which includes the high-pressure refrigerant, and the outside.

Specifically, an O-ring is placed between the partition member 213 and the valve body 211, and a male thread formed on an outer circumferential surface of the partition member 213 and a female thread formed on an inner circumferential surface of the valve body 211 are tightly coupled with each other. Thereby, a gap between the partition member 213 and the valve body 211 is sealed, and the partition member 213 and the valve body 211 are fixed together.

When a coil 26 is energized, the rotor 25 is rotated to generate the drive force for driving the valve element 212. The rotor 25 includes a plurality of magnetic poles arranged in a rotational direction of the rotor 25. The coil 26 generates a magnetic field for rotating the rotor 25 when the coil 26 is energized. The rotor 25 and the coil 26 form a stepping motor.

The lower case 22 is a member that receives the coil 26, the partition member 213, a magnetic flux sensor 27 and a control circuit board 28. The lower case 22 is placed at the outside of the partition member 213 and forms a waterproof case in cooperation with the upper case 23.

A cylindrical tubular portion 22a, which is shaped in a cylindrical tubular form, opens at a bottom portion of the lower case 22, and the partition member 213 is coaxially inserted into the cylindrical tubular portion 22a. A seal structure is implemented by an O-ring 29 installed in a gap between the cylindrical tubular portion 22a of the lower case 22 and the partition member 213. The O-ring 29 is a seal member that is placed between the cylindrical tubular portion 22a and the partition member 213 and is configured to limit intrusion of a liquid into an inside of the lower case 22.

An insertion groove 22b, into which the bracket 24 is inserted, is formed at an outer peripheral surface of the lower case 22. The insertion groove 22b extends in a direction (a left-to-right direction in FIG. 3) that is perpendicular to an axial direction of the valve element 212.

Figure 4:
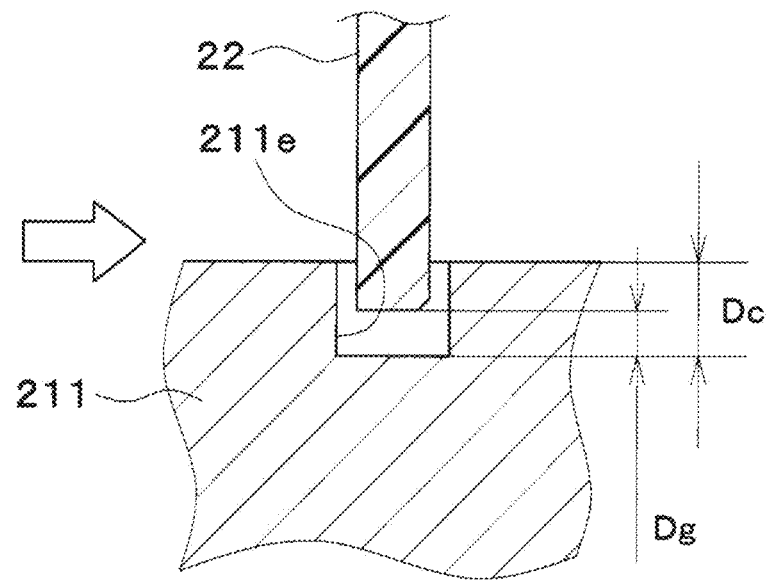
FIG. 4 is a cross-sectional view showing a portion of the expansion valve of the first embodiment, indicating a state where a clearance between a lower case and a valve body is within a tolerance.
Figure 5:
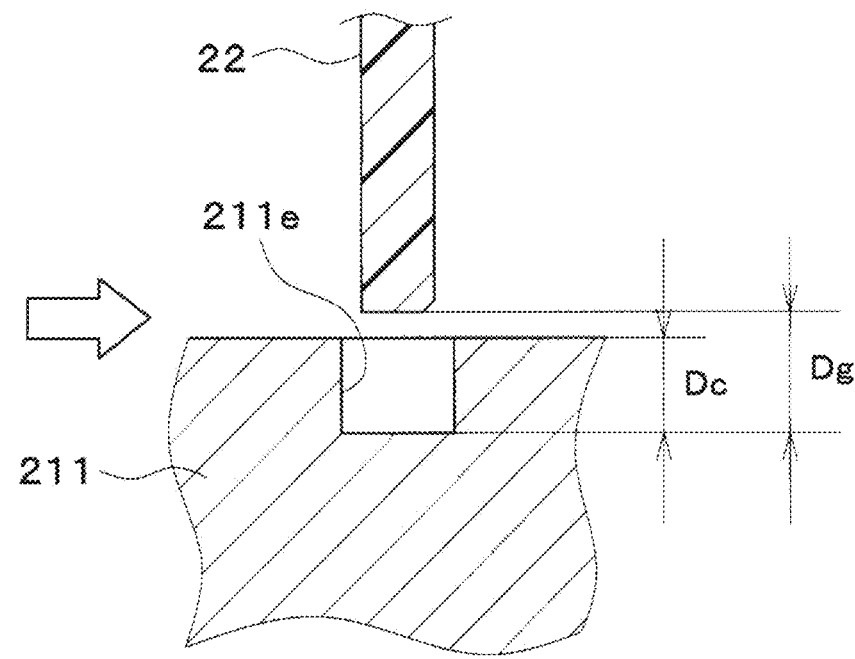
FIG. 5 is a cross-sectional view showing the portion of the expansion valve of the first embodiment, indicating a state where the clearance between the lower case and the valve body is out of the tolerance.

As shown in FIGS. 4 to 5, a body groove 211e, into which a lower end portion of the lower case 22 is fitted, is formed at an upper surface of the valve body 211. A depth dimension Dc of the body groove 211e is the same as a clearance tolerance between the valve body 211 and the lower case 22.

Thereby, in a quality inspection process of the expansion valve 20, it is possible to reliably check whether a clearance dimension Dg between the valve body 211 and the lower case 22 is equal to or smaller than the tolerance. The inspection for checking whether the clearance dimension Dg between the valve body 211 and the lower case 22 is equal to or smaller than the tolerance is carried out by determining whether a light, which is laterally irradiated as indicated by a blank arrow in FIGS. 4 to 5, passes to the other side.

Specifically, in a case where the clearance dimension Dg between the valve body 211 and the lower case 22 is larger than the tolerance, since the lower end of the lower case 22 is not placed at the inside of the body groove 211e of the valve body 211, as indicated in FIG. 5, the light, which is laterally irradiated, passes to the other side.

In contrast, in another case where the clearance dimension Dg between the valve body 211 and the lower case 22 is equal to or smaller than the tolerance, since the lower end of the lower case 22 is placed at the inside of the body groove 211e of the valve body 211, as shown in FIG. 4, the light, which is laterally irradiated, does not pass to the other side. Therefore, it is possible to reliably check whether the clearance dimension Dg between the valve body 211 and the lower case 22 is equal to or smaller than the tolerance.

Figure 6:
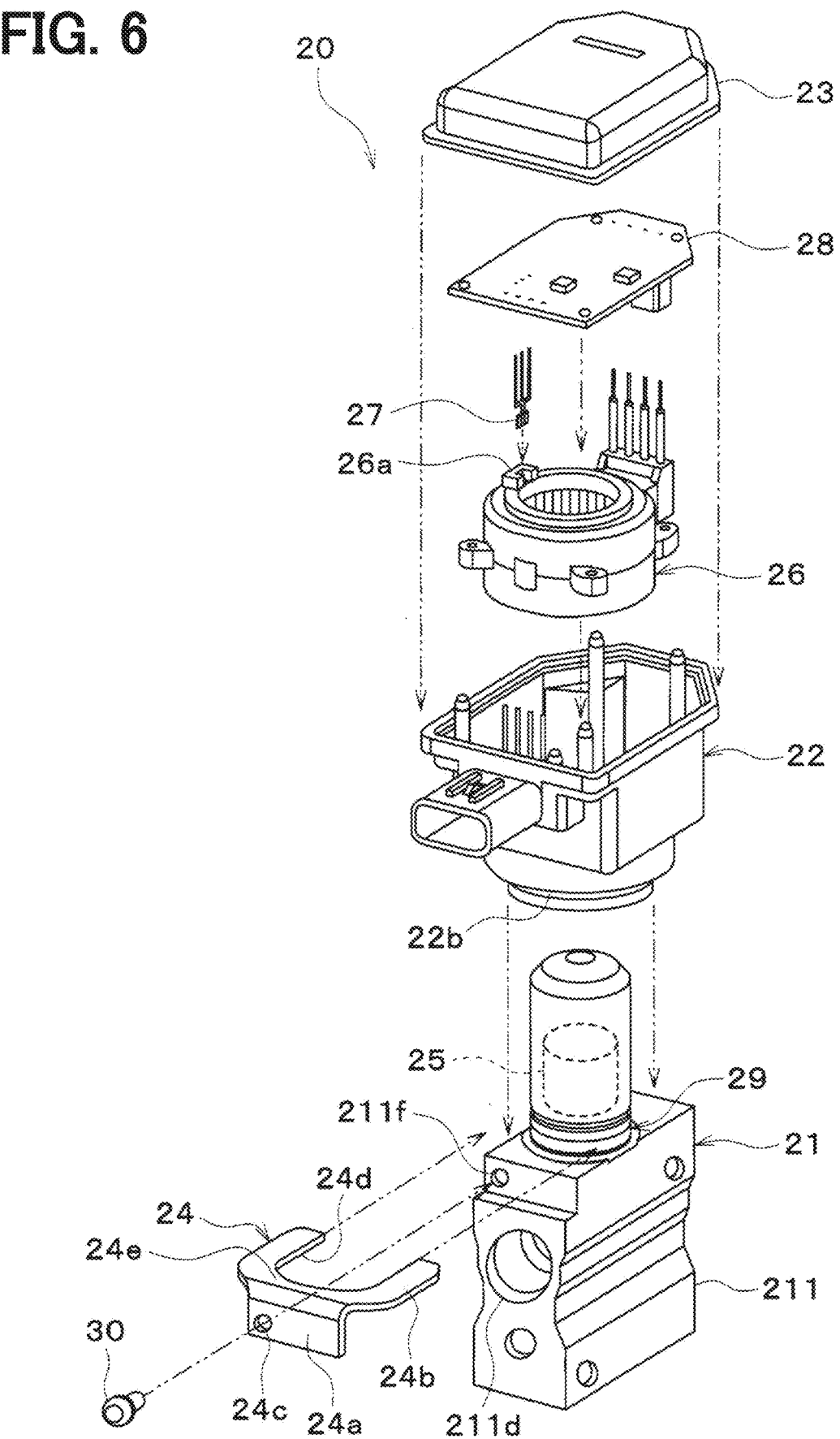
FIG. 6 is an exploded perspective view showing the expansion valve of the first embodiment.

The coil 26 is placed on the radially outer side of the rotor 25 and the partition member 213 and is coaxial with the rotor 25 and the partition member 213. As shown in FIG. 6, the coil 26 has a holder 26a that holds the magnetic flux sensor 27. The holder 26a is integrally molded by a molded resin that seals wires of the coil 26.

The magnetic flux sensor 27 is a magnetic flux density sensing device that senses a magnetic flux density. In other words, the magnetic flux sensor 27 is a magnetic flux change sensing device that senses a magnetic flux change generated in response to the rotation of the rotor 25.

Since the magnetic flux sensor 27 is held by the coil 26, a positional accuracy of the magnetic flux sensor 27 relative to the rotor 25 can be improved in comparison to a case where the magnetic flux sensor 27 is held by the lower case 22. Therefore, the sensing accuracy of the magnetic flux density by the magnetic flux sensor 27 can be improved.

The control circuit board 28 is an electric circuit board that controls the energization of the coil 26 based on a measurement signal outputted from the magnetic flux sensor 27.

The upper case 23 is a lid member that seals the opening of the lower case 22. The lower case 22 and the upper case 23 are made of resin. The lower case 22 and the upper case 23 are fixed together by means of laser welding. Therefore, a gap between the lower case 22 and the upper case 23 is liquid-tightly sealed to limit water ingress to electric control components, such as the control circuit board 28 and the magnetic flux sensor 27.

The bracket 24 is a member that is used to fix the lower case 22 to the valve body 211. The bracket 24 has a planar plate form that is bent in an L-shape. Specifically, the bracket 24 has a body-side portion 24a, which extends toward the valve body 211, and a case-side portion 24b, which extends toward the lower case 22. The body-side portion 24a extends in a direction parallel to an axial direction of the partition member 213. The case-side portion 24b extends in a direction perpendicular to the axial direction of the partition member 213.

A bending angle of the bracket 24 is 90 degrees (i.e., a right angle). An outer shape of the bracket 24 is line symmetric. The bracket 24 is made of stainless steel.

The body-side portion 24a has a screw hole 24c. A female threaded hole 211f is formed at a lateral surface of the valve body 211. The bracket 24 is securely fastened to the valve body 211 by a body-side screw 30.

The case-side portion 24b has a cutout 24d that is shaped to correspond with a shape of the insertion groove 22b of the lower case 22. Adjacent portions of the case-side portion 24b, which are adjacent to the cutout 24d, are inserted into the insertion groove 22b of the lower case 22.

Figure 7:
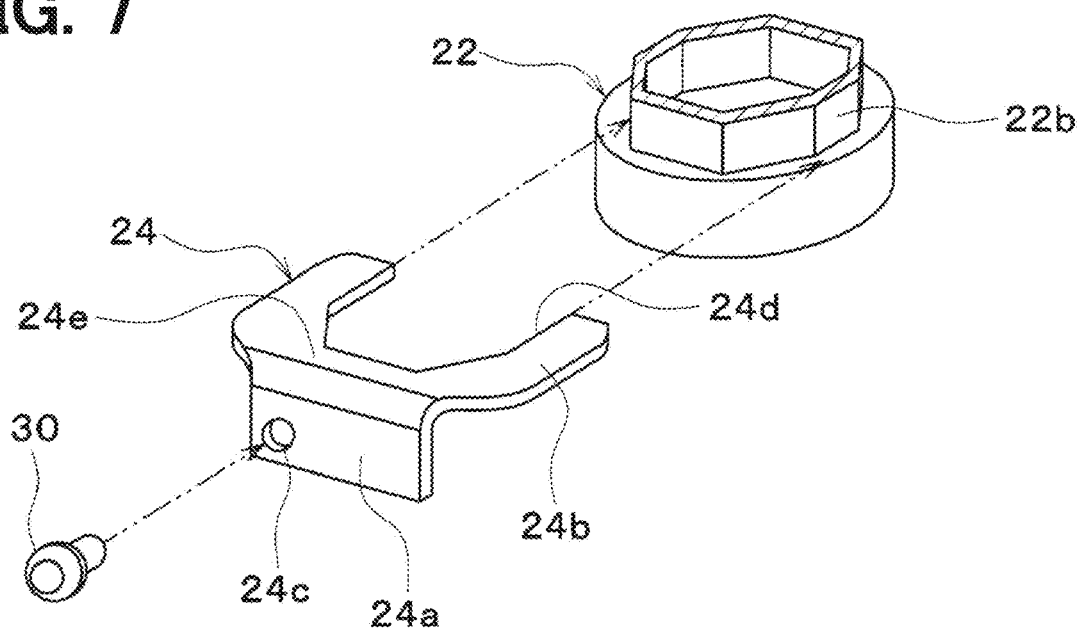
FIG. 7 is a perspective view showing a rotation limiter structure for limiting rotation between the lower case and a bracket at the expansion valve of the first embodiment.

The cutout 24d of the bracket 24 and the insertion groove 22b of the lower case 22 form a rotation limiter structure. As shown in FIG. 7, the cutout 24d of the bracket 24 has a polygonal shape, and the insertion groove 22b of the lower case 22 has a polygonal shape. The polygonal shape of the cutout 24d and the polygonal shape of the insertion groove 22b correspond with each other to form the rotation limiter structure.

Each of the polygonal shape of the cutout 24d of the bracket 24 and the polygonal shape of the insertion groove 22b of the lower case 22 is a regular polygonal shape, so that the bracket 24 can be inserted into the insertion groove 22b of the lower case 22 from any one of a plurality of directions. This configuration allows use of the bracket 24 and the lower case 22 in other products to achieve the common use of the components.

A fit of the bracket 24 to the insertion groove 22b of the lower case 22 is a clearance fit that enables movement of the bracket 24 in the inserting direction. In other words, a gap is provided between the insertion groove 22b of the lower case 22 and the bracket 24 in a width direction of the bracket 24 and also a thickness direction of the bracket 24.

In the state where the bracket 24 is inserted into the insertion groove 22b of the lower case 22, the bracket 24 protrudes from the lower case 22 in a view taken in the axial direction of the valve element 212. A portion 24e (hereinafter referred to as a protruding portion 24e) of the case-side portion 24b of the bracket 24, which protrudes from the insertion groove 22b, has a shape that is line symmetric.

Next, an assembling procedure of the expansion valve 20 will be described. First, in a bracket insertion process, the bracket 24 is inserted into the insertion groove 22b of the lower case 22. Since the fit of the bracket 24 to the insertion groove 22b of the lower case 22 is the clearance fit, the bracket 24 can move relative to the lower case 22 in the inserting direction.

Figure 8:
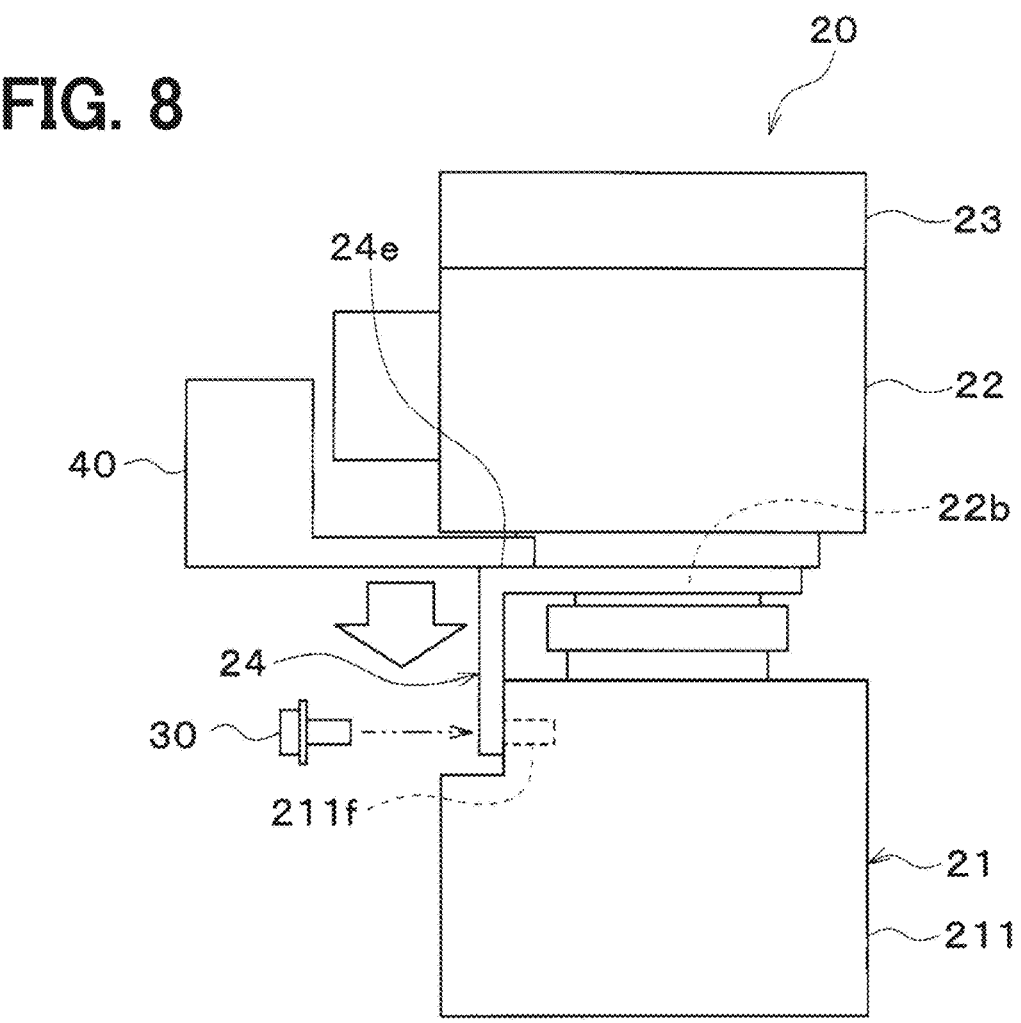
FIG. 8 is a front view showing a state where the bracket is urged toward the valve body by a jig at the time of assembling the expansion valve of the first embodiment.

Next, in a lower case assembling process, the lower case 22 and the bracket 24 are assembled to the valve body 211 of the main body 21. At this time, as indicated by a blank arrow in FIG. 8, the bracket 24 is securely fastened to the valve body 211 while urging the protruding portion 24e of the bracket 24 toward the valve body 211 (a downward side in FIG. 8) by a jig 40. Specifically, the body-side screw 30 is inserted into the screw hole 24c of the bracket 24 and the female threaded hole 211f of the valve body 211 to securely fasten the bracket 24 to the valve body 211.

Since the bracket 24 is securely fastened to the valve body 211 in the state where the bracket 24 has a degree of freedom in terms of movement in the inserting direction relative to the lower case 22, a manufacturing error(s) can be absorbed, and the lower case 22 can be assembled coaxially with the partition member 213. Therefore, it is possible to limit uneven compression of the O-ring 29.

Since the bracket 24 is urged toward the valve body 211 (the downward side in FIG. 8) by the jig 40 at the time of securely fastening the bracket 24 to the valve body 211, the lower case 22 is fixed to the valve body 211 in the state where the lower case 22 is urged toward the valve body 211. This configuration can limit the lower case 22 from moving in the fastening direction (the left-to-right direction in FIG. 8) after the bracket 24 is securely fastened to the valve body 211.

Next, in a coil assembling process, the coil 26 is assembled to the lower case 22. Then, the magnetic flux sensor 27 is assembled to the holder 26a of the coil 26. Thereafter, the control circuit board 28 is assembled to the lower case 22. At this time, terminals of the control circuit board 28 are connected to terminals of the coil 26, and lead lines of the magnetic flux sensor 27 are soldered to the control circuit board 28.

Next, in an upper case assembling process, the upper case 23 is laser-welded to the lower case 22 to close the opening of the lower case 22. By executing the above processes, the assembling of the expansion valve 20 is completed.

In the present embodiment, the bracket 24 has: the body-side portion 24a that extends in the direction parallel to the axial direction of the partition member 213 and is securely fastened to the valve body 211 by the fastener member (body-side screw) 30; and the case-side portion 24b that extends in the direction different from the axial direction of the partition member 213 and is installed to the lower case 22. The bracket 24 is securely fastened to the valve body 211 by the fastener member 30 in the direction perpendicular to the axial direction of the partition member 213 through the body-side portion 24a.

Furthermore, the lower case 22 and the bracket 24 form an enabler structure that is configured to enable the movement of the bracket 24 relative to the lower case 22 in the fastening direction in which the bracket 24 is fastened to the valve body 211 by the fastener member 30.

By providing the enabler structure described above, at the time of securely fastening the bracket 24 to the valve body 211, the manufacturing error(s) can be absorbed, and the lower case 22 can be assembled coaxially with the partition member 213. Thus, the eccentricity of the lower case 22 can be limited.

In the present embodiment, the bracket 24 has the protruding portion 24e that protrudes from the lower case 22 in the view taken in the axial direction of the partition member 213. With this configuration, at the time of securely fastening the bracket 24 to the valve body 211, the bracket 24 can be securely fastened to the valve body 211 while urging the protruding portion 24e of the bracket 24 toward the valve body 211 by the external force. This configuration can limit the lower case 22 from moving in the fastening direction (the left-to-right direction in FIG. 8) after the bracket 24 is securely fastened to the valve body 211.

In the present embodiment, the enabler structure, which enables the movement of the bracket 24, includes the insertion groove 22b. The insertion groove 22b is formed at the lower case 22, and the bracket 24 is inserted into the insertion groove 22b. The fit between the bracket 24 and the insertion groove 22b is the clearance fit that enables the movement of the bracket 24 relative to the lower case 22 in the fastening direction. With this configuration, it is possible to enable the movement of the bracket 24 relative to the lower case 22 in the fastening direction in which the bracket 24 is fastened to the valve body 211 by the fastener member 30.

In the present embodiment, the insertion groove 22b is formed at the outer peripheral surface of the lower case 22, and the bracket 24 has the cutout 24d that is shaped to correspond with the shape of the insertion groove 22b. With this configuration, the enabler structure, which enables the movement of the bracket 24, can be simplified.

In the present embodiment, the insertion groove 22b and the cutout 24d form the rotation limiter structure that is configured to limit the rotation of the bracket 24 relative to the lower case 22 in a circumferential direction about a central axis of the partition member 213. With this configuration, it is possible to limit the rotation of the lower case 22 relative to the valve body 211 in the circumferential direction about the central axis of the partition member 213 after the assembling.

In the present embodiment, the coil 26 has the holder 26a that holds the magnetic flux sensor 27. With this configuration, since the magnetic flux sensor 27 is held by the coil 26, the positional accuracy of the magnetic flux sensor 27 relative to the rotor 25 can be improved in comparison to the case where the magnetic flux sensor 27 is held by the lower case 22. Therefore, the sensing accuracy of the magnetic flux density by the magnetic flux sensor 27 can be improved.

Second Embodiment

In the embodiment described above, the cutout 24d of the bracket 24 has the polygonal shape, and the insertion groove 22b of the lower case 22 has the polygonal shape. The polygonal shape of the cutout 24d and the polygonal shape of the insertion groove 22b correspond with each other to form the rotation limiter structure.

Figure 9:
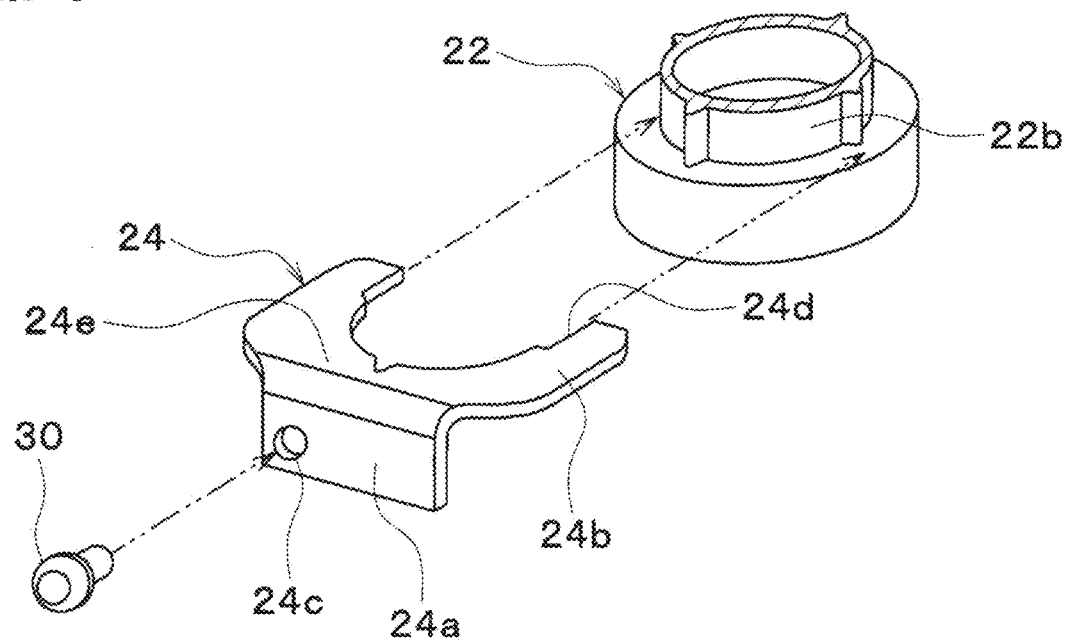
FIG. 9 is a perspective view showing a rotation limiter structure for limiting rotation between the lower case and the bracket at the expansion valve of a second embodiment.
Figure 10:
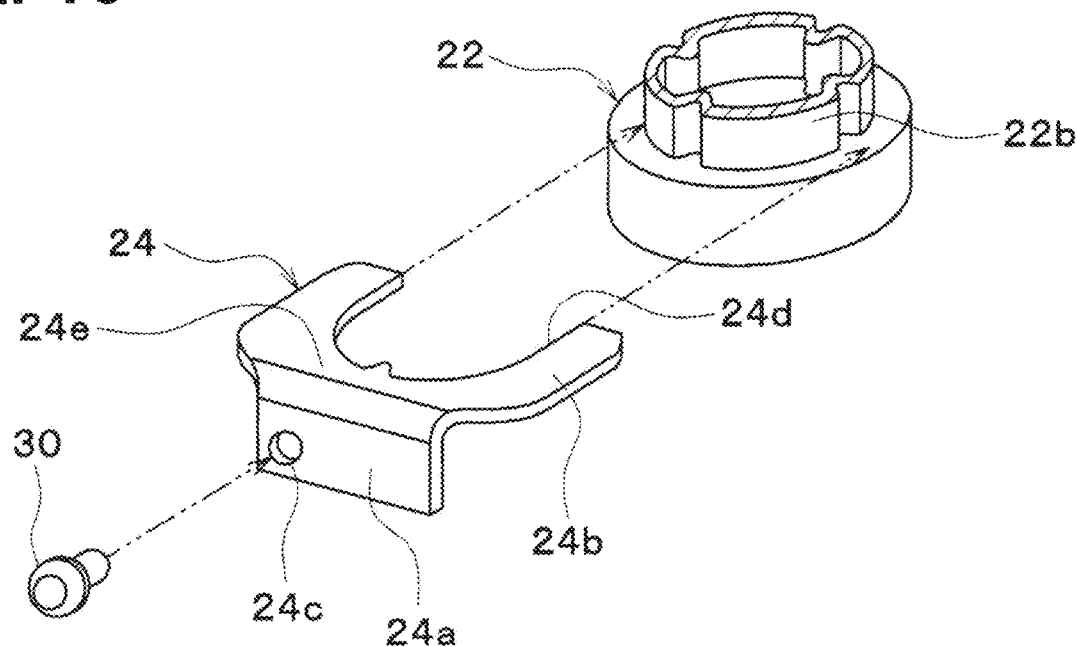
FIG. 10 is a perspective view showing another rotation limiter structure for limiting rotation between the lower case and the bracket at the expansion valve of the second embodiment.

In the present embodiment, as shown in FIGS. 9 and 10, the cutout 24d of the bracket 24 and the insertion groove 22b of the lower case 22 have a configuration of a recess and a projection which are engaged with each other to form the rotation limiter structure.

In a first working example shown in FIG. 9, the recess is formed at the cutout 24d of the bracket 24, and the corresponding projection (a corresponding one of a plurality of projections) is formed at the insertion groove 22b of the lower case 22. In a second working example shown in FIG. 10, the projection is formed at the cutout 24d of the bracket 24, and the corresponding recess (a corresponding one of a plurality of recesses) is formed at the insertion groove 22b of the lower case 22. According to these working examples, the rotation limiting function can be reliably implemented.

Third Embodiment

In the embodiment described above, the cutout 24d of the bracket 24 has the polygonal shape, and the insertion groove 22b of the lower case 22 has the polygonal shape. The polygonal shape of the cutout 24d and the polygonal shape of the insertion groove 22b correspond with each other to form the rotation limiter structure. In the present embodiment, as shown in FIG. 11, the rotation limiter structure is formed by a case-side screw 31 that is fastened to the lower case 22.

The lower case 22 has a pedestal 22d. A female threaded hole 22c, into which the case-side screw 31 is threadably fastened, is formed at the pedestal 22d. The bracket 24 has a pedestal hole 24f, into which the pedestal 22d is inserted. A thickness of the pedestal 22d is larger than a thickness of the bracket 24. An inner diameter of the pedestal hole 24f is larger than an outer diameter of the pedestal 22d.

Figure 11:
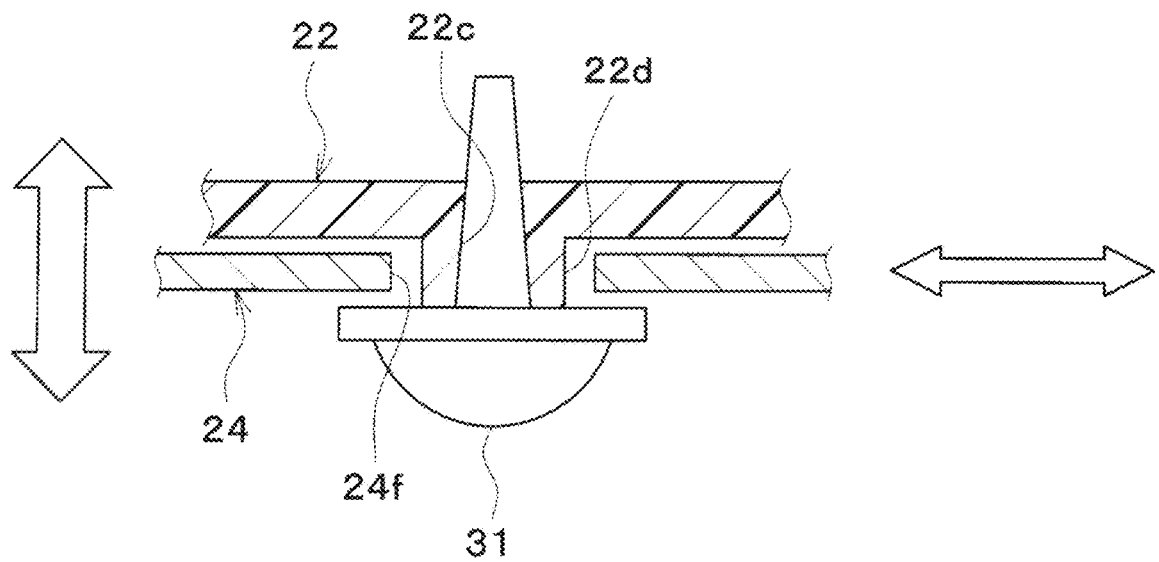
FIG. 11 is a cross-sectional view showing a rotation limiter structure for limiting rotation between the lower case and the bracket at the expansion valve of a third embodiment.

In a state where the pedestal 22d is inserted into the pedestal hole 24f of the bracket 24, the case-side screw 31 is threadably fastened to the female threaded hole 22c, thereby enabling the assembling of the bracket 24 to the lower case 22 in a state where the bracket 24 has a degree of freedom in terms of movement in the left-to-right direction in FIG. 11 relative to the lower case 22.

According to the present embodiment, the bracket 24 is assembled to the lower case 22 through use of the case-side screw 31, so that the bracket 24 can be reliably assembled to the lower case 22.

Fourth Embodiment

Figure 12:
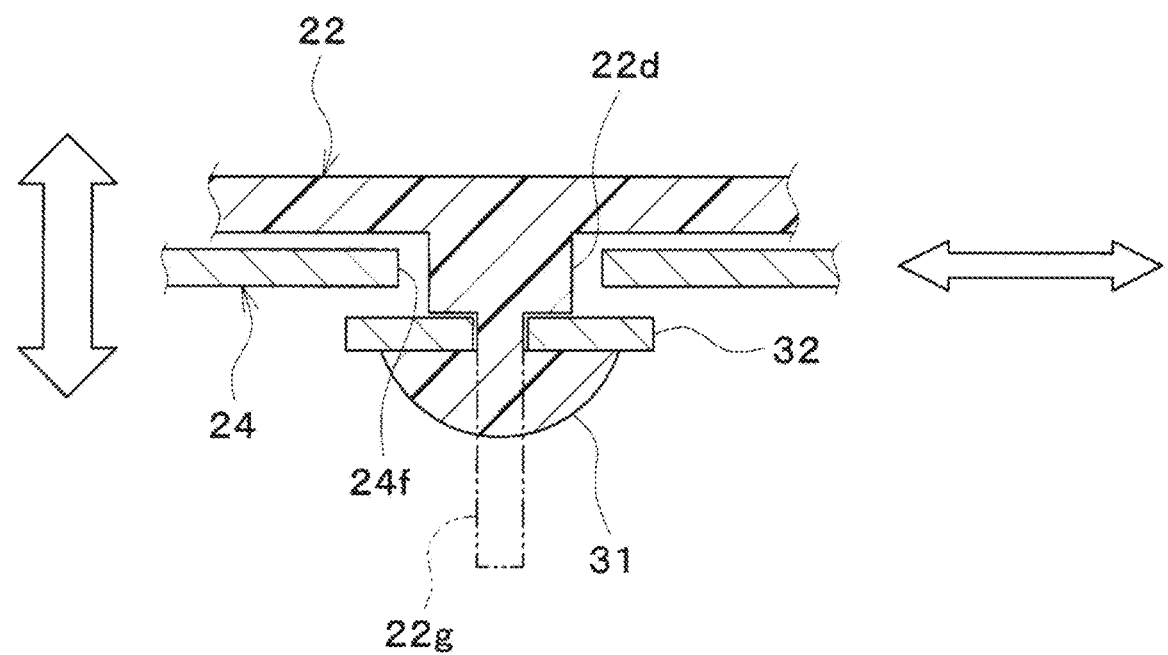
FIG. 12 is a cross-sectional view showing a rotation limiter structure for limiting rotation between the lower case and the bracket at the expansion valve of a fourth embodiment.

In the third embodiment described above, the bracket 24 is assembled to the lower case 22 by the case-side screw 31. In contrast, in the present embodiment, the bracket 24 is assembled to the lower case 22 by heat welding, as shown in FIG. 12. In FIG. 12, a shape of the lower case 22 before execution of the heat welding is indicated by a dot-dot-dash line.

A pin 22g is formed at the pedestal 22d of the lower case 22 in the state before the execution of the heat welding. In the state where the pedestal 22d is inserted into the pedestal hole 24f of the bracket 24, and a washer 32 made of metal (e.g., stainless steel) is inserted over the pin 22g, the heat is applied to the pin 22g to melt the pin 22g. Therefore, the bracket 24 is assembled to the lower case 22 in a state where the bracket 24 has a degree of freedom in terms of movement in the left-to-right direction in FIG. 12 relative to the lower case 22.

By overlapping the washer 32 on the bracket 24, it is possible to limit the heated and melted pin 22g from entering a gap between the bracket 24 and the pedestal 22d and sticking therebetween.

According to the present embodiment, the bracket 24 is assembled to the lower case 22 by the heat welding, so that the bracket 24 can be reliably assembled to the lower case 22.

Fifth Embodiment

In the above embodiment, the bending angle of the bracket 24 is 90 degrees (i.e., the right angle). In contrast, in the present embodiment, as shown in FIG. 13, the bending angle of the bracket 24 is an acute angle.

An angle, which is defined between a contact surface of the valve body 211 to be in contact with the bracket 24 and an extending direction of the insertion groove 22b of the lower case 22, is 90 degrees. Therefore, the bending angle of the bracket 24 is smaller than the angle defined between the contact surface of the valve body 211 to be in contact with the bracket 24 and the extending direction of the insertion groove 22b of the lower case 22.

Figure 13:
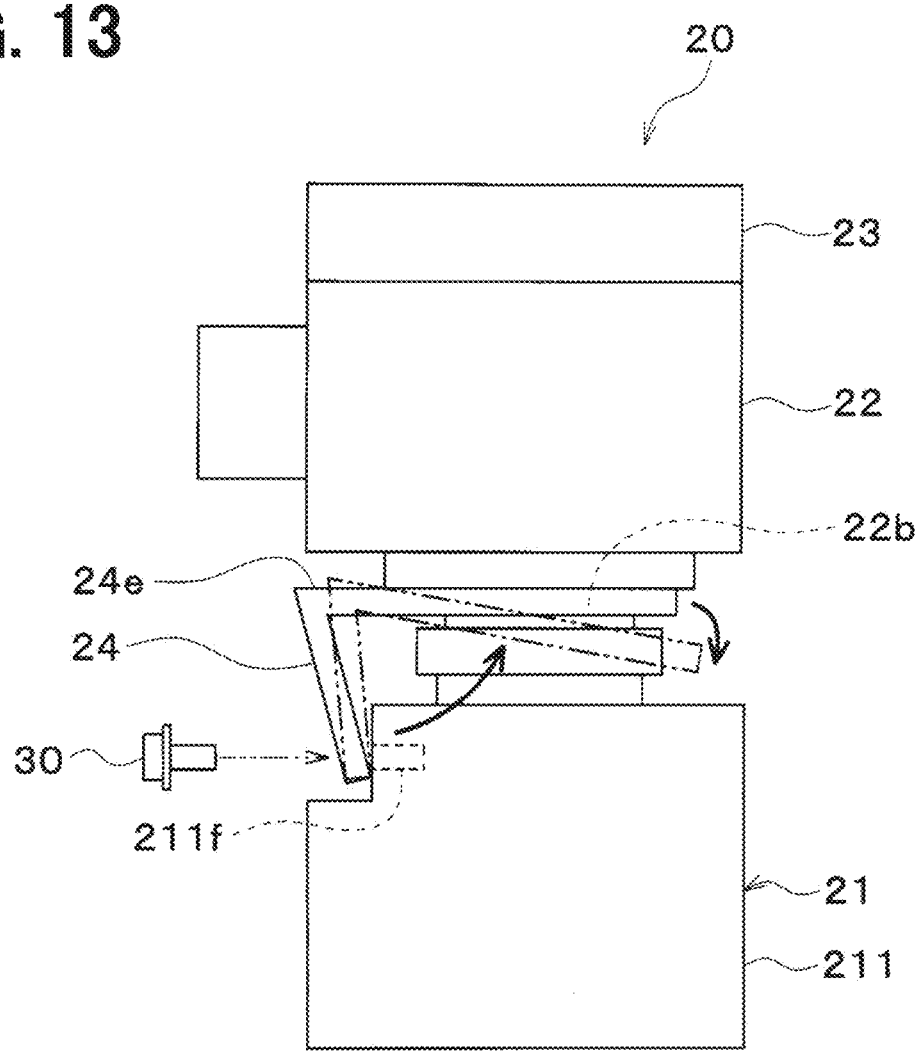
FIG. 13 is a front view showing the expansion valve of a fifth embodiment.

With this configuration, at the time of securely fastening the bracket 24 to the valve body 211 by the body-side screw 30, the bracket 24 urges the lower case 22 toward the valve body 211 (the downward side in FIG. 13). Therefore, it is possible to enable the movement of the bracket 24 relative to the lower case 22 in the fastening direction (the left-to-right direction in FIG. 13) in which the bracket 24 is fastened to the valve body 211 by the fastener member 30.

In the present embodiment, the insertion groove 22b extends in the direction perpendicular to the axial direction of the partition member 213, and the bracket 24 is shaped in the plate form and is bent at the bending location between the portion of the bracket 24, which is securely fastened to the valve body 211, and the other portion of the bracket 24, which is installed to the lower case 22. Furthermore, the bending angle of the bracket 24, which is bent at the bending location, is the acute angle.

With this configuration, at the time of securely fastening the bracket 24 to the valve body 211, the lower case 22 can be urged toward the valve body 211 by the bracket 24. Therefore, it is possible to limit the lower case 22 from moving in the fastening direction (the left-to-right direction in FIG. 13) after the bracket 24 is securely fastened to the valve body 211.

Sixth Embodiment

Figure 14:
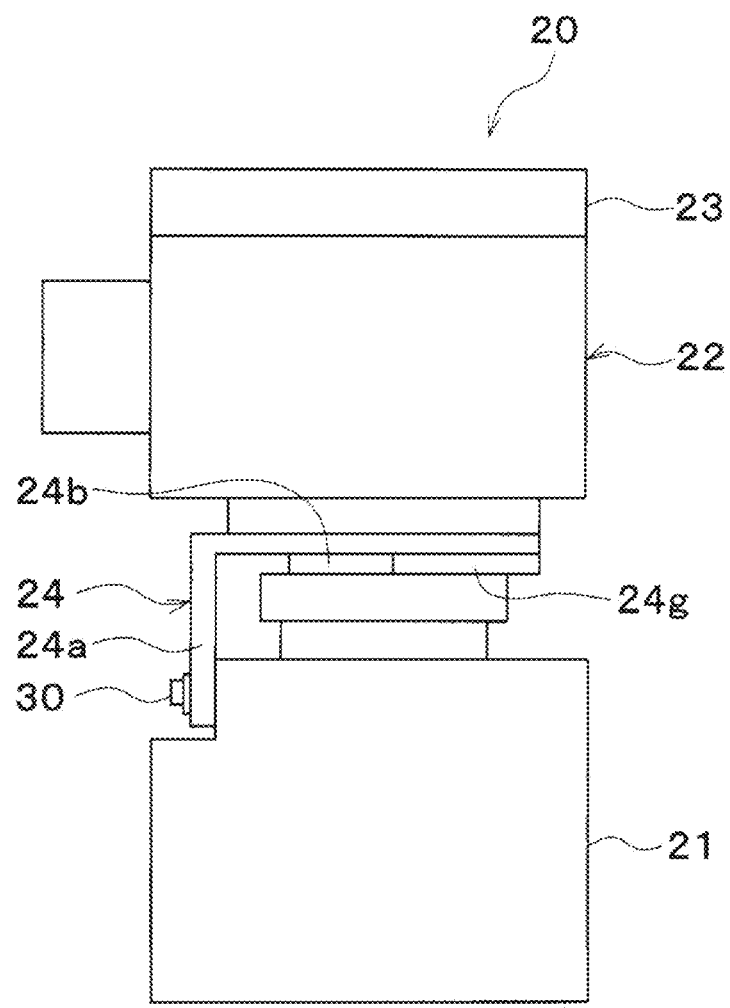
FIG. 14 is a front view showing the expansion valve of a sixth embodiment.
Figure 15:
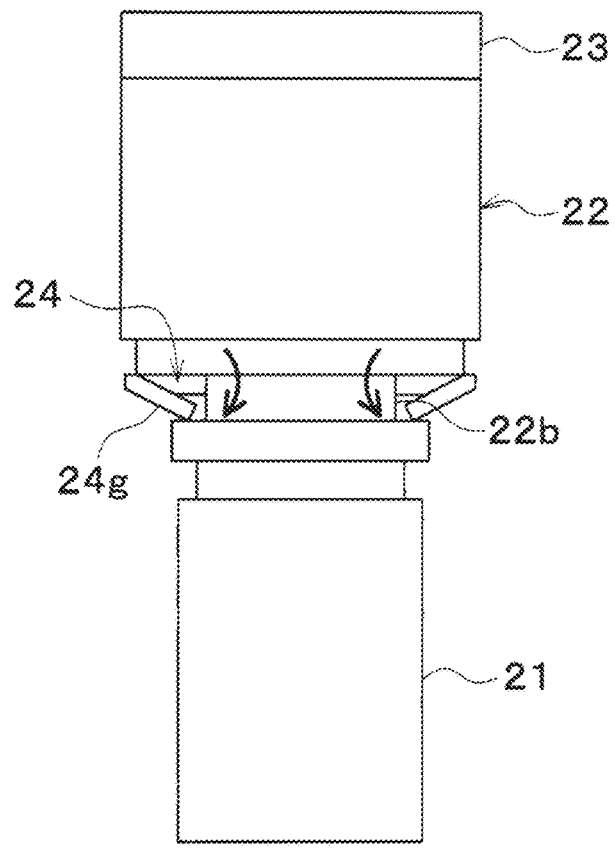
FIG. 15 is a side view showing the expansion valve of a sixth embodiment.
Figure 16:
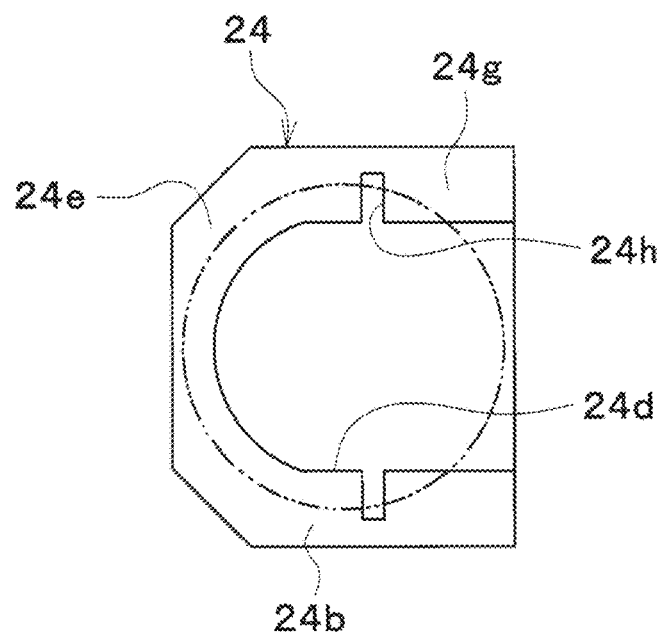
FIG. 16 is a plan view showing the bracket of the expansion valve of the sixth embodiment.

In the first embodiment described above, the protruding portion 24e of the bracket 24 is urged toward the valve body 211 by the jig 40 at the time of securely fastening the bracket 24 to the valve body 211, and thereby the lower case 22 is urged toward the valve body 211. In contrast, in the present embodiment, as shown in FIGS. 14 to 16, the lower case 22 is urged toward the valve body 211 (toward the downward side in FIGS. 14 to 15) by a plurality of urging portions 24g of the bracket 24. Each of the urging portions 24g is formed by plastically deforming a corresponding portion of the bracket 24 in a twisting manner as indicated by an arrow in FIG. 15 after the bracket 24 is securely fastened to the valve body 211. The bracket 24 has a plurality of cutouts 24h to ease the plastic deformation.

By urging the lower case 22 toward the valve body 211 (the downward side in FIGS. 14 to 15) by the urging portions 24g of the bracket 24, it is possible to limit the movement of the lower case 22 in the fastening direction (the left-to-right direction in FIG. 14) after the bracket 24 is securely fastened to the valve body 211.

In the present embodiment, the bracket 24 has the urging portions 24g which are bent to urge the lower case 22 toward the valve body 211. This configuration can limit the lower case 22 from moving in the fastening direction (the left-to-right direction in FIG. 14) after the bracket 24 is securely fastened to the valve body 211.

Seventh Embodiment

Figure 17:
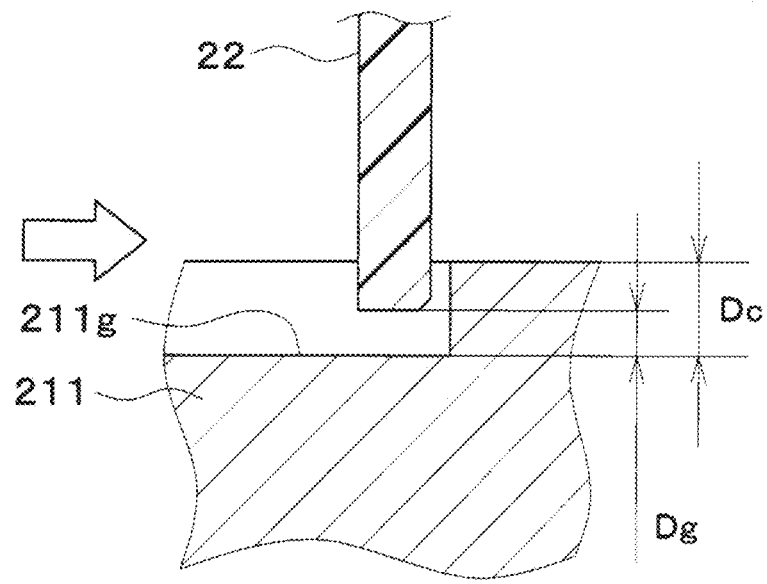
FIG. 17 is a cross-sectional view showing a portion of the expansion valve of a seventh embodiment, indicating a state where a clearance between the lower case and the valve body is within a tolerance.
Figure 18:
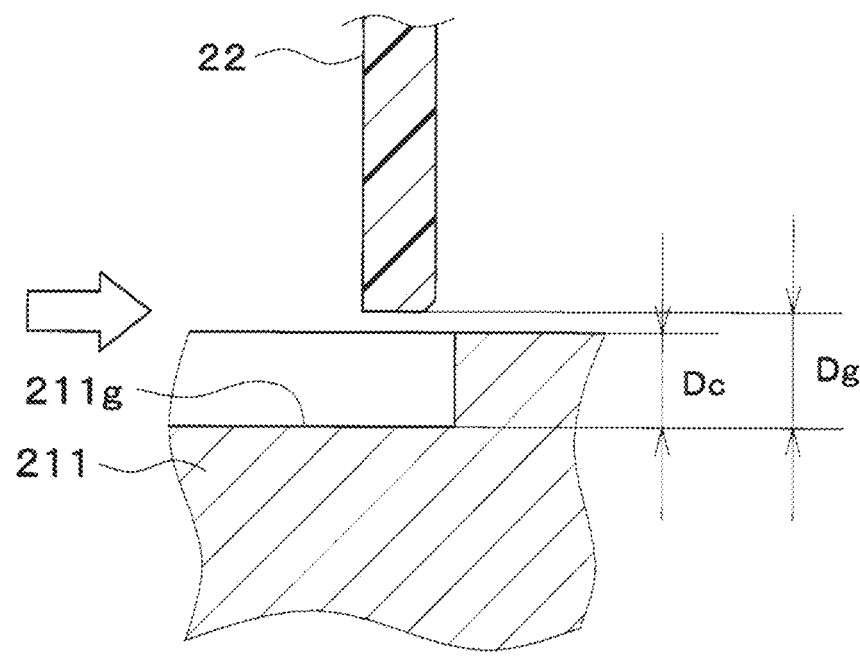
FIG. 18 is a cross-sectional view showing the portion of the expansion valve of the seventh embodiment, indicating a state where a clearance between the lower case and the valve body is out of the tolerance.

In the first embodiment described above, the body groove 211e, into which the lower end portion of the lower case 22 is fitted, is formed at the upper surface of the valve body 211. In contrast, in the present embodiment, as shown in FIGS. 17 to 18, a body cutout 211g, into which the lower end portion of the lower case 22 is fitted, is formed at the upper surface of the valve body 211.

A depth dimension Dc of the body cutout 211g is the same as a clearance tolerance between the valve body 211 and the lower case 22.

Thereby, like in the first embodiment, in the quality inspection process of the expansion valve 20, it is possible to reliably check whether the clearance dimension Dg between the valve body 211 and the lower case 22 is equal to or smaller than the tolerance.

The present disclosure is not limited to the above-described embodiments and may be modified in various ways as follows without departing from the spirit of the present disclosure.

In the fifth embodiment described above, the bending angle of the bracket 24 is the acute angle, and the angle defined between the contact surface of the valve body 211 to be in contact with the bracket 24 and the extending direction of the insertion groove 22b of the lower case 22 is 90 degrees. Alternatively, the bending angle of the bracket 24 may be set to be 90 degrees, and the angle defined between the contact surface of the valve body 211 to be in contact with the bracket 24 and the extending direction of the insertion groove 22b of the lower case 22 may be set to be an obtuse angle.

In this case, the bending angle of the bracket 24 becomes smaller than the angle defined between the contact surface of the valve body 211 to be in contact with the bracket 24 and the extending direction of the insertion groove 22b of the lower case 22. Therefore, at the time of securing fastening the bracket 24 to the valve body 211 by the body-side screw 30, the lower case 22 is urged toward the valve body 211 by the bracket 24. This configuration can limit movement of the valve body 211 after the bracket 24 is securely fastened to the valve body 211.

In the embodiments described above, the valve element 212 is driven by the stepping motor, which includes the rotor 25 and the coil 26. Alternatively, various types of electric motors may be used as the electric actuator that drives the valve element 212.

In the embodiments described above, the vapor compression refrigeration cycle 10 is applied to the vehicle air conditioning device. However, the application subject of the vapor compression refrigeration cycle 10 is not limited to this.

For example, the vapor compression refrigeration cycle 10 may be applied to a stationary air conditioning device, a freezer/refrigerator device, a hot water supply device or the like.

Although the present disclosure has been described with reference to the embodiments and the modifications, it is understood that the present disclosure is not limited to the embodiments and the modifications and structures described therein. The present disclosure also includes various variations and variations within the equivalent range. Also, various combinations and forms, as well as other combinations and forms that include only one element, more, or less, are within the scope and ideology of the present disclosure.

What is claimed is:

1. An expansion valve comprising:
    a body that forms a refrigerant flow passage;
    a valve element that is configured to adjust an opening degree of the refrigerant flow passage;
    a rotor that is configured to drive the valve element;
    an electric circuit board that is configured to control rotation of the rotor;
    a partition member that is shaped in a cylindrical tubular form and is fixed to the body, wherein the partition member receives the rotor;
    a case that is placed at an outside of the partition member and receives the electric circuit board, wherein the case has a cylindrical tubular portion that is coaxial with the partition member;
    an O-ring that is placed between the cylindrical tubular portion and the partition member and is configured to limit intrusion of a liquid into an inside of the case;
    a bracket that has:
        a body-side portion that extends in a direction parallel to an axial direction of the partition member and is securely fastened to the body; and
        a case-side portion that extends in a direction different from the axial direction of the partition member and is installed to the case; and
    a fastener member that is configured to securely fasten the bracket to the body through the body-side portion, wherein:
    the case and the bracket form an enabler structure that is configured to enable movement of the bracket relative to the case in a fastening direction in which the bracket is fastened to the body by the fastener member.

2. The expansion valve according to claim 1, wherein the bracket has a protruding portion that protrudes from the case in a view taken in the axial direction of the partition member.

3. The expansion valve according to claim 1, wherein:
    the enabler structure includes an insertion groove that is formed at the case, where the bracket is inserted into the insertion groove; and
    a fit between the bracket and the insertion groove is a clearance fit that enables the movement of the bracket relative to the case in the fastening direction.

4. The expansion valve according to claim 3, wherein:
    the insertion groove is formed at an outer peripheral surface of the case; and
    the bracket has a cutout that is shaped to correspond with a shape of the insertion groove.

5. The expansion valve according to claim 4, wherein the insertion groove and the cutout form a rotation limiter structure that is configured to limit rotation of the bracket relative to the case in a circumferential direction about a central axis of the partition member.

6. The expansion valve according to claim 3, wherein:
    the insertion groove extends in a direction perpendicular to the axial direction of the partition member;
    the bracket is shaped in a plate form and is bent at a bending location between a portion of the bracket, which is securely fastened to the body, and another portion of the bracket, which is installed to the case; and
    a bending angle of the bracket, which is bent at the bending location, is an acute angle.

7. The expansion valve according to claim 1, wherein the bracket has an urging portion that is bent to urge the case toward the body.

8. The expansion valve according to claim 1, comprising:
a coil that is received in the case and is configured to generate a magnetic field to rotate the rotor; and
a magnetic flux sensor that is configured to sense a change in a magnetic flux generated in response to the rotation of the rotor, wherein:
the coil has a holder that holds the magnetic flux sensor.

* * * * *